United States Patent [19]

Kemmler

[11] 4,402,335

[45] Sep. 6, 1983

[54] DAMPING UNIT FOR MEASURING AND AUTOMATIC CONTROL SYSTEMS

[75] Inventor: Lothar Kemmler, Mörfelden, Fed. Rep. of Germany

[73] Assignee: Samson Aktiengesellschaft, Frankfurt, Fed. Rep. of Germany

[21] Appl. No.: 254,190

[22] Filed: Apr. 14, 1981

[30] Foreign Application Priority Data

May 6, 1980 [DE] Fed. Rep. of Germany ....... 3017321

[51] Int. Cl.$^3$ .............................................. F16F 9/30
[52] U.S. Cl. ..................................... 137/82; 188/268; 251/48
[58] Field of Search .......................... 188/268; 251/48; 137/82, 85

[56] References Cited

U.S. PATENT DOCUMENTS

| 2,963,259 | 12/1960 | Heyer | 251/48 |
| 3,134,585 | 5/1964 | Trask | 188/268 X |
| 3,141,523 | 7/1964 | Dickie | 188/268 X |
| 3,441,053 | 4/1969 | Robinson | 251/54 X |
| 3,638,767 | 2/1972 | Elsner | 188/268 |

Primary Examiner—Alan Cohan
Attorney, Agent, or Firm—Watson, Cole, Grindle & Watson

[57] ABSTRACT

A damping system, more specially, for measuring and automatic control systems takes the form of mass of damping liquid placed between two parts which may be moved in relation to each other and which are to be damped. By the selection of the damping liquid, as for example a silicone oil, and of the form and size of the space between the two moving parts and, furthermore, of the properties of the two parts touched by the liquid, it is possible to make certain that the liquid is kept in place by surface tension effects, that is to say because of its own surface tension and the surface tension properties of the lining faces touched by it.

The damping unit may take the form of two, more specially frusto-conical plates, able to be moved in relation to each other and of which one may undergo adjustment by using a threaded rod and a lock nut. Furthermore, as a further development of the invention, the damping liquid may be kept in an open-sided but otherwise pot-like space between an U-shaped female part and a male part, able to be moved vibratingly within it.

As a still further development, the female part has a through-hole and the male part is placed within it. A larger or smaller amount of the damping liquid may then be forced by a piston into the space between the male and female parts.

9 Claims, 7 Drawing Figures

DAMPING UNIT FOR MEASURING AND AUTOMATIC CONTROL SYSTEMS

BACKGROUND OF THE INVENTION

The present invention is with respect to a damping unit using a damping liquid positioned between two parts which may be moved in relation to each other. The damping unit of the present invention is more specially designed for measuring and automatic control systems, whose moving or rocking parts have to be damped. This is for example important in the case of measuring systems with feedback.

Such damping systems have, on the one hand, to be designed for operation with as little friction as possible, but, on the other hand, they have to be designed for causing the desired degree of damping of the rocking motion of moving parts of the plant in question, because if the damping effect is overly stiff, operation of the system will not be fast enough, while if the damping effect is not strong enough, the time taken for a clear reading or adjustment to be produced is overly long. An account of liquid damping systems is to be seen in German Pat. No. 1,625,619 in which a damping liquid or a damping gas such as air is used between a piston-like part and a cylindrical part. The damping liquid space or cylinder as a dashpot has to be sealed off from the outside for keeping the damping liquid in the space or cylinder and for stopping loss thereof when the damping system is moved. For this reason, the damping effect is only produced with a complex system needing much space and which furthermore may only be assembled by experienced persons. Furthermore, adjustment of the system is hard to undertake.

GENERAL OUTLINE OF THE INVENTION

One purpose of the present invention is that of designing a specially simply and low-price damping unit needing little space, working without friction and giving a very exact damping effect which may be used for any purpose in question.

Generally speaking, it may be said that this and other purposes of the invention are effected inasfar as the nature of the damping liquid and the design of the faces touched thereby on the parts moved in relation to each other are such that, taking these two design angles into account, the damping liquid has the tendency of keeping to its position in the space, in which it is placed, between the faces of the parts with which it is in contact.

This is responsible for a surprising effect inasmuch as, on making such a selection and combination of the damping liquid and the faces touched by it, no sealing measures are necessary for stopping undesired loss of the damping liquid from the system. In fact, the damping liquid keeps itself in the position designed for taking it up without the damping effect being made any less good thereby. It is even possible for a better and more sensitive damping effect to be produced, because the damping liquid is not shut off in a sealed space and, in fact, it is even possible to say that there is a free "breathing" effect of the liquid, which is able to keep up with the smallest and fastest rocking motions of the system part which is to be damped.

An important point in the present invention, in line with one of the main teachings as so far detailed, is the selection and combination of a damping liquid with the best properties for the purpose in view and, on the other hand, of a material for the faces or parts, walling off the damping liquid, which is between the parts, such faces having the best possible properties for the purpose on hand. More specially, the damping liquid may be in the form of an oil-like material, whose properties are: The evaporation rate of the material is so low that the damping function of the liquid is kept up at the desired level for the full working life of the system to be damped and furthermore the liquid is not to be damaged or changed by the effect of the environment, such as light acting on it and oxygen from the air, and, lastly, the viscosity of the liquid is to be as little dependent on temperature as possible. As for the selection of the sort of damping liquid to be used in the invention, it is possible to take as a general guideline the thought that the surface tension of the damping liquid is to be greater with respect to air than with respect to the faces touched by it or confining it. For general use, a liquid silicone compound such as, more specially, silicone oil (for example dimethylpolysiloxane) has turned out to have very good properties for use in the present invention. As a material for parts "wetted" by the damping liquid and which are moved in relation to each other, shutting off the damping liquid between them in a narrow space, it is possible to make use, for example, of polymers of fluorinated hydrocarbons, of perfluoroalkylethers, of vinylidene fluoride or of copolymers of TFE and hexafluoropropylene, or of materials with the same desired properties. More specially, a polymer in the form of polytetrafluoroethylene ("Teflon") has turned out to be specially useful for the purposes of the present invention. If desired, it is furthermore possible to make use of other pairs of materials (that is to say damping liquid and wall material) as for example glycerol and polytetrafluoroethylene or normal silicone-free mineral oils with fluorinated hydrocarbons.

A number of different designs of the damping system for field use are possible. A general teaching in the case of such systems as part of the invention will be that the damping liquid is placed freely, and without being shut in from the side, in a space between two wall faces.

A specially useful and simple form of the invention is such that the damping liquid is placed between two disks, of which the one, the moving disk, is joined up with a rocking part (as for example the arm of a lever) while the other disk, which is kept more or less fixed in position, is supported on a fixed part of the system having the damping unit of the invention. Further useful forms and developments of the invention as for example parts for adjustment of the desired damping effect and further working examples of the invention will be made clear in more detail in the dependent claims. Moreover, measuring and automatic control systems or other systems with moving parts to be damped, more specially systems with a nozzle-baffle system and with feedback and which have a damping unit of the present invention, may be said to come within the limits of the invention.

DETAILED ACCOUNT OF WORKING EXAMPLES OF THE INVENTION

In the case of the working examples of the invention to be seen in FIGS. 1 to 7, the damping unit is to be seen, to simplify the present description, in connection with a lever arm 1 capable of rocking about a turning point 2. It is to be assumed that the lever arm 1 is part of a measuring or automatic control system, as for example an i/p transforming system, wherein there is a tendency of vibration of the lever, which has to be damped.

Figure 2:
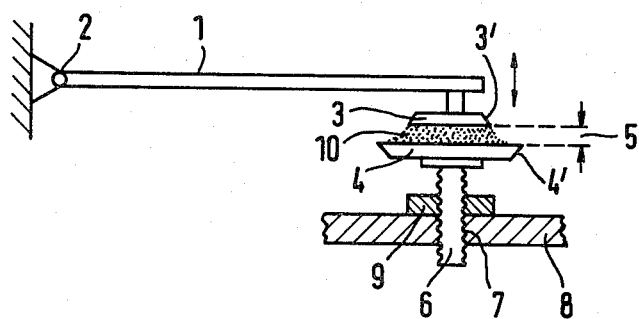
FIG. 2 is a side view and part-section of a development of the damping unit of FIG. 1 of good effect.

As part of a specially simple and useful working example of the invention to be seen in FIG. 2, the free end of lever arm 1 is joined with a moving disk 3, for example a round disk, opposite which at a certain spacing there is, generally speaking, a fixed-position disk 4, which is also round in outline. Disk 4 is best made with a greater diameter than disk 3 and a useful effect is produced if the difference in the diameters of the two disks is at least 10 to 20%. In some cases, furthermore, the moving disk 3 may be made with a greater diameter than disk 4. Furthermore, a useful effect is produced in the invention if the outer edge 3′ or 4′ of one or each disk 3 or 4 is designed narrower and extends to a point towards the space 5 walled in by the two disks. If the disk or each disk has the form of a low section of a cone (frustum of a cone), the base angle of such cone is to be naturally smaller than 90° and may, for example, be about 45°.

For adjustment of the spacing between the two disks 3 and 4 and, for this reason, of the size of the space 5 therebetween, at least one of them, that is to say in FIG. 2, the fixed-position larger disk 4, is supported so that adjustment along its central axis is possible and, for this purpose, disk 4 may simply be fixed to the free end of a threaded rod 6, which may be screwed into a threaded hole 7 of a fixed-position part 8 and tightly fixed in place by means of a lock nut 9.

In the space between the two disks 3 and 4, there is, as part of the invention, an amount of damping liquid 10, generally taking up the full space between the two disks, such liquid being of the type noted earlier, as for example a liquid silicone compound such as a silicone oil (for example dimethylpolysiloxane). In connection with the operation and effect of this damping liquid, it is important for the present invention for the wall faces, contacted by the damping liquid, of disks or plates 3 and 4, or to make the design simpler, the complete disks themselves, to be made of a material of the type noted as for example fluorinated hydrocarbon polymer such as polytetrafluoroethylene (Teflon). On using such materials together of such materials as a damping fluid and a limiting wall face the damping liquid 10 will readily be kept in the spacing 5 between the two disks 3 and 4 without any further measure having to be taken for this purpose. When the lever arm 1 is rockingly vibrated together with its disks 3, the damping liquid 10 will be firstly forced somewhat out of the spacing 5 so as to be bulging out from the edge of the space at the edge of the disks, while on motion in the opposite direction, the damping liquid will be pulled back into the space. For this reason, the damping liquid is firstly acted upon by a pushing and then by a pulling force, that is to say compression and tension first in one direction and then in the other.

Figure 1:
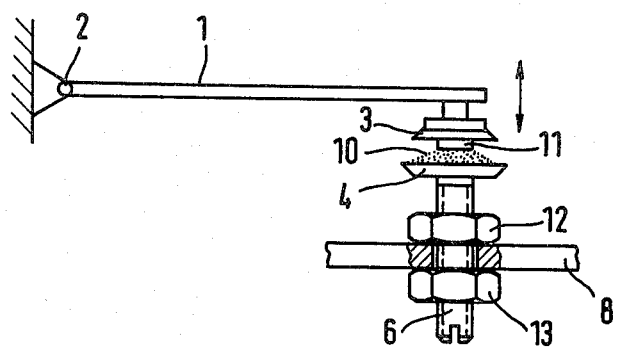
FIG. 1 is a side view and part-section of a damping unit for measuring or automatic control systems.

A somewhat changed form of the system of the invention of FIG. 2 is to be seen in FIG. 1 wherein the moving disk 3 has at its side facing disk 4, an outwardly extending round headpiece 11 of Teflon or the like. The silicone oil or other damping liquid 10 is, in this case, kept, for this reason, between the fixed-position disk 4 and the headpiece 11, it "breathing" in the spacing between the two disks when the lever arm 1 is vibrated or rocked. The threaded rod 6 supporting the disk 4 is tightly locked to part 8 by way of two nuts 12 and 13 so that adjustment may take place by unthreading the nuts 12 and 13 and thereafter retightening them.

Figure 3:
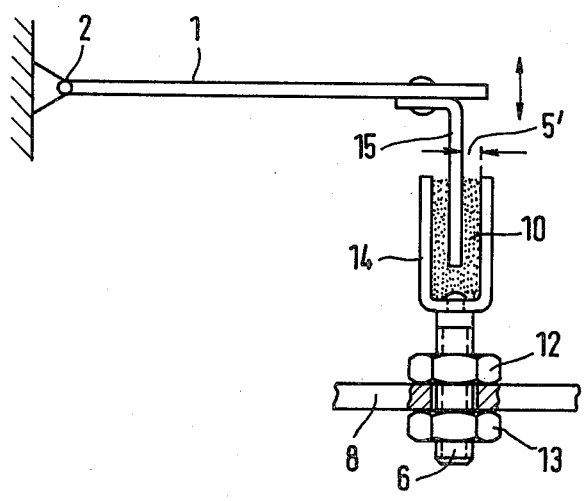
FIG. 3 is a side view of a further working example of the damping unit.
Figure 4:
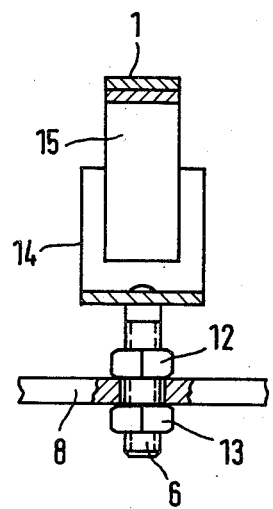
FIG. 4 is a cross-section through the damping unit of FIG. 3.

The spacing gap or clearance 5 between the two disks 3 and 4 does not, in every case, have to be horizontal. Even if the spacing is placed at an angle or is upright, it is still possible to keep the damping liquid 10 between the faces walling it off or confining it, if such faces are faces of polytetrafluoroethylene (Teflon) or another material with the same effects as mentioned hereinabove. A working example of such a design is shown in FIGS. 3 and 4, in which case a generally fixed-position limiting or confining face is formed in a U-like part 14, while the other, moving wall face is on a flat or tongue-like part 15 affixed to the lever arm 1 and extending downwardly between the arms of the U-like part 14 so as to maintain a spacing 5′ between it and the arms. In the spaces or the interstices on the two sides of the flat part, the damping oil 10 is again positioned, for example silicon oil. The damping liquid does not have to be present in such an amount as to extend as far as the base or root of the U-like part, although such an amount has useful effects for controlling the damping effect. The U-like part 14 is fixed, for this purpose, with its base on the top end of the threaded rod 6, which, as in FIG. 1, has two nuts 12, 13 so that adjustment thereof is possible and then, on tightening the nuts, may be fixed to the part 8. The two parts 14 and 15 or at least the wall faces touched by the damping liquid 10 are, in this part of the invention, made of polytetrafluoroethylene (Teflon) or a material with the same effect as noted earlier the damping liquid then maintaining its position between the parts 14 and 15. The degree of damping may be changed by adjustment of the position of the U-like female part 14 in relation to the male or flat part 15. In this case as well, upon movement of the male flat part 15 in relation to the U-like female part 14 there is first a forcing of the damping liquid out of the space 5′ somewhat and then a pulling back of the liquid into the space in harmony with the rhythm of the vibrating lever arm 1, the desired, controlled damping of the rocking vibration motion taking place.

Figure 5:
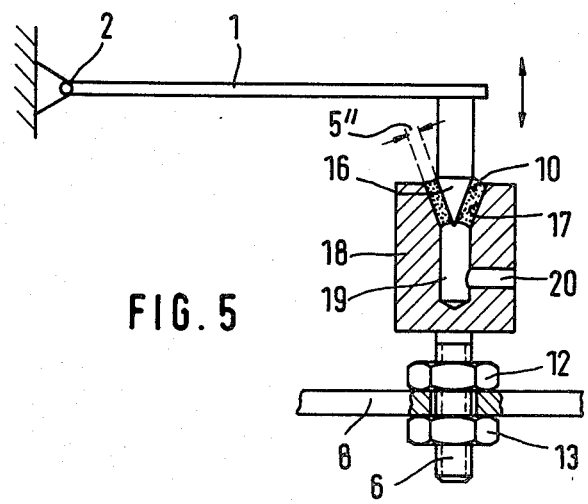
FIG. 5 is a view, partly from the side and partly in section, of a further working example of the damping unit of the invention.

Another example of the invention is seen in FIG. 5 as similar in some respects to FIGS. 1 and 2 and in other respects to FIGS. 3 and 4. The space 5″ taking up the damping liquid 10, is in this case coned as the female part of the unit taking up a moving male part or cone 16 fixed to lever arm 1. The female space is walled off or confined by the inner face of a coned opening 17 in a, generally speaking, fixed-position body 18. Male cone 16 and at least the inner face limiting the coned opening 17 of body 18 are, as part of the invention, made of polytetrafluoroethylene (Teflon) or a material with the same properties. Body 18 may, as in FIG. 1, be joined to part 8 so that, using threaded rod 6 and the two nuts 12 and 13, it may be axially adjusted and then be tightened and fixed in position. Because of this adjustment of body 18, it is possible for the distance between the wall of the coned opening 17 and the male cone 16, and, for this reason, the breadth of clearance 5" to be changed for adjustment of the damping effect. For stopping any effect limiting the damping motion or the "breathing" in the rhythm of the damping liquid, the inner or female space 19 of body 18 is exposed to the outside air through a breather hole 20.

Figure 6:
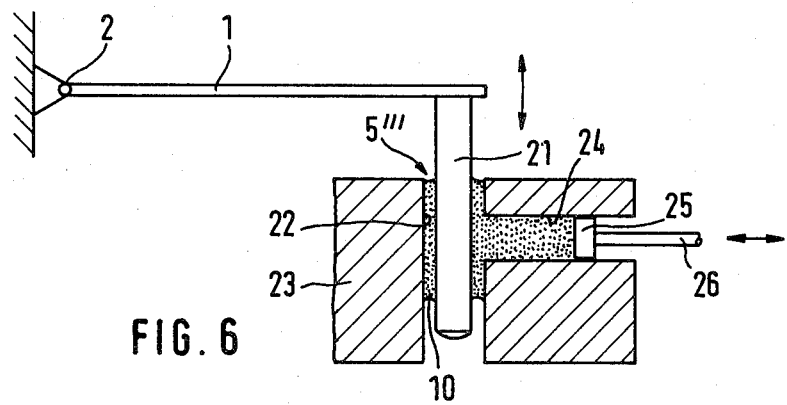
FIG. 6 is a side view and a section of a still further working example of the damping unit.

It is furthermore possible, as part of the present invention, for the amount of the damping liquid present in the space at least in part, for the breadth of the gap or clearance to be changed for adjustment as shown in FIG. 6 wherein a moving male part 21, for example in the form of a pin, is fixed to lever arm 1, there being a gap clearance or spacing 5''' between such male part 21 and the inner, for example cylindrical, bore face of an opening 22 of a generally fixed-position body 23 into which the male part extends. The ring-like space 5''' takes up a damping liquid 10 of the aforementioned type as for example silicone oil. A hole in the side of opening 22 communicates with a cylinder 24 which houses a piston 25 which may be moved, for example, by an adjustment piston rod 26 for pumping more or less liquid into the space between pin 21 and body 23. With this further system, which, in effect, may be used with other working examples of the invention, the damping effect may be changed in addition for adjustment.

Figure 7:
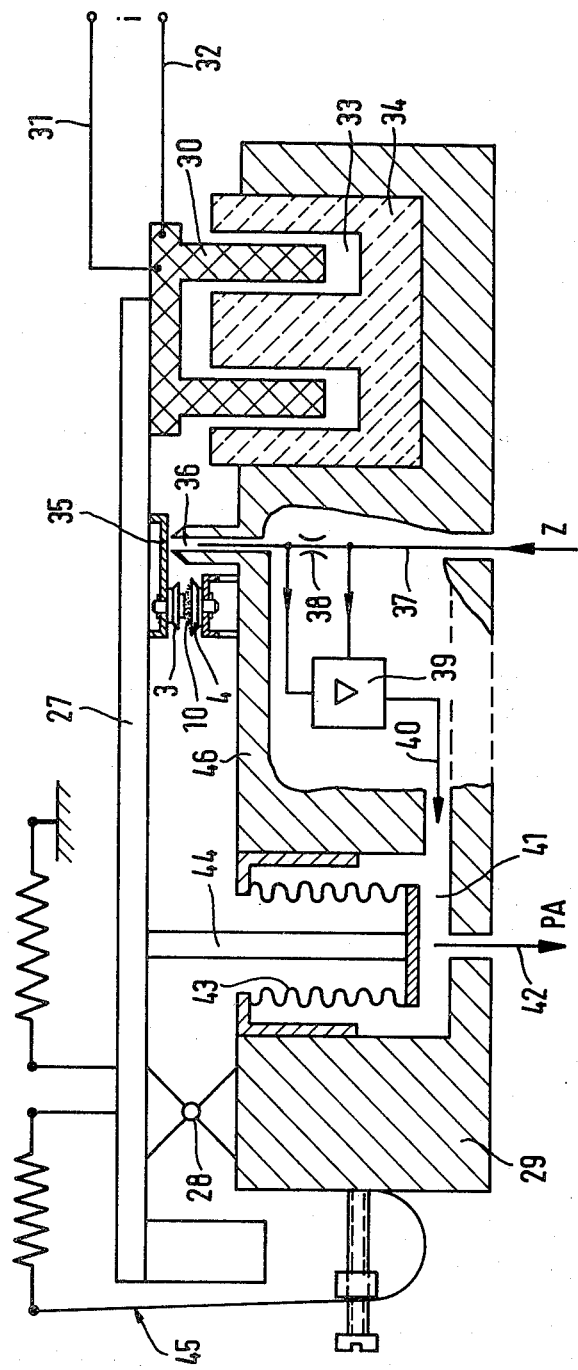
FIG. 7 is a longitudinal section of a system for converting measured values and mechanical signals, having a damping unit of the present invention.

An example of the damping unit of the invention in operation within a working apparatus, is shown diagrammatically in FIG. 7, the apparatus being an electropneumatic i/p transforming system for measured values and servo motion. Lever arm 1 of the FIGS. 1 to 6 unit is shown in FIG. 7 as a lever arm 27 connected to a support base 29 by a crossing spring joint 28 so that the lever arm may be rockingly vibrated. At the free end of lever arm 27 there is a moving coil 30 in the form of a ring which receives electrical pulses from an electronic measuring instrument, as for example a temperature measuring instrument, through wires 31 and 32. Moving coil 30 is positioned within a ring space or annular gap 33 of a permanent magnet 34 mounted in the base 29. Opposite a baffle plate 35, adjacent lever arm 27, there is a nozzle 36 into which an air line 37 extends, the line having a choke 38 for regulating the incoming air from source Z, the nozzle-baffle plate system controlling in a known manner an amplifier 39 interconnected with line 37, and having an outlet or output line 40 in communication with a pulse space or plenum 41 with an output pressure line 42 outputting the servo pressure at PA. A return bellows 43, extending into the space within plenum 41, is connected to lever arm 27 by a bellows rod 44 for balancing the lever system. An apparatus 45 is used for adjustment of the zero position of the system. The damping unit of the invention, which occupies but a small space, is, for example, located adjacent the nozzle-baffle plate system between lever arm 27 and a part 46 of the apparatus. The damping liquid 10 as, for example, a silicone oil, is, as in FIG. 1 or, more specifically FIG. 2, disposed between the moving part 3 and the part 4, which, although it is fixed in position, may undergo adjustment when needed. The silicone oil may be simply loaded after mechanical assembly of the system, using a pipette, the silicone oil itself having the tendency to maintain its position between the teflon faces of the parts or disks 3 and 4 in space 5, in which it will, at first, readily assume its desired position. The vibration of the lever arm 27, during operation of the system, is then damped by the unit of the invention with a useful effect and without any rubbing or friction.

In other forms of apparatus, the damping unit of the invention may be positioned in a manner depending on the general design and positioning of parts of the vibrating part.

The invention is not limited to the aforedescribed working examples shown in the drawings, but includes variations which incorporate the essence of the invention.

I claim:

1. A damping unit for measuring and for automatic control systems, comprising two parts having confronting surfaces in spaced apart relation, said parts being relatively movable toward and away from one another, a damping liquid disposed in the space between said surfaces in contact therewith and having the tendency to spread out in said space, said damping liquid comprising silicone oil such as dimethylpolysiloxane, at least the surfaces of said parts contacted by said damping liquid comprising a fluorinated hydrocarbon polymer, and the space between said surfaces being open at the sides thereof, whereby said damping liquid and said surfaces function to maintain said damping liquid between said parts without the need for any confining means.

2. A damping unit as claimed in claim 1, wherein said parts comprise spaced disks, one of said disks being movable and affixed to a vibrating element, the other of said disks being fixedly mounted on a stationary apparatus.

3. A damping unit as claimed in claim 2, wherein said surfaces of said disks are round, one of said surfaces being at least 10% greater in diameter than said other disk.

4. A damping unit as claimed in claim 3, wherein said disks have outer ends decreasing in thickness and terminating in sharp edges.

5. A damping unit as claimed in claim 4, wherein at least one of said disks takes the form of a section of a cone with an angle at its base of less than 90°.

6. A damping unit as claimed in claim 1, wherein said parts are relatively adjustable for changing the space therebetween.

7. A damping unit as claimed in claim 6, wherein one of said parts is fixed in position, a threaded rod on which said one part is mounted for adjusting said one part.

8. A damping unit as claimed in claim 1, further comprising an apparatus having an electropneumatic signal transforming system, said apparatus further having a vibrating lever arm to which one of said parts is connected, a nozzle-baffle plate system located between said lever arm and a fixed position of the apparatus, said parts being located adjacent said nozzle-baffle plate system.

9. A damping unit as claimed in claim 1, wherein said fluorinated hydrocarbon polymer comprises polyletrafluoroethylene.

* * * * *